US009682760B1

(12) United States Patent
O'Brien et al.

(10) Patent No.: US 9,682,760 B1
(45) Date of Patent: Jun. 20, 2017

(54) SYSTEMS AND METHODS FOR SETTING ENGINE SPEED RELATIVE TO OPERATOR DEMAND

(71) Applicant: Brunswick Corporation, Lake Forest, IL (US)

(72) Inventors: William P. O'Brien, Eden, WI (US); Jason S. Arbuckle, Horicon, WI (US); Andrew J. Przybyl, Berlin, WI (US)

(73) Assignee: Brunswick Corporation, Lake Forest, IL (US)

( * ) Notice: Subject to any disclaimer, the term of this patent is extended or adjusted under 35 U.S.C. 154(b) by 261 days.

(21) Appl. No.: 14/684,952

(22) Filed: Apr. 13, 2015

(51) Int. Cl.

| | |
|---|---|
| ***G06F 19/00*** | (2011.01) |
| ***B63H 21/21*** | (2006.01) |
| ***F02D 11/10*** | (2006.01) |
| ***F02D 9/02*** | (2006.01) |

(52) U.S. Cl.
CPC ............... *B63H 21/21* (2013.01); *F02D 9/02* (2013.01); *F02D 11/105* (2013.01); *B63H 2021/216* (2013.01); *F02D 2009/023* (2013.01)

(58) Field of Classification Search
CPC ......... F02M 23/085; B60W 2510/0638; F02D 31/00; F02D 31/006; F02D 41/22
USPC .................. 701/85, 103, 104, 110, 114, 115; 123/406.51, 406.52, 492, 493
See application file for complete search history.

(56) References Cited

U.S. PATENT DOCUMENTS

| | | | |
|---|---|---|---|
| 4,939,660 | A | 7/1990 | Newman et al. |
| 5,080,064 | A | 1/1992 | Buslepp et al. |
| 5,836,851 | A | 11/1998 | Ruman |
| 5,848,582 | A | 12/1998 | Ehlers et al. |
| 6,009,371 | A | 12/1999 | Kobayashi |
| 6,152,102 | A | 11/2000 | Ruman |
| 6,273,771 | B1 | 8/2001 | Buckley et al. |

(Continued)

FOREIGN PATENT DOCUMENTS

| | | |
|---|---|---|
| WO | 00/68744 | 11/2000 |

OTHER PUBLICATIONS

Arbuckle et al., Marine Propulsion System with Efficient Engine Speed Delta, Unpublished U.S. Appl. No. 14/284,795, filed May 22, 2014.

(Continued)

*Primary Examiner* — John Kwon
(74) *Attorney, Agent, or Firm* — Andrus Intellectual Property Law, LLP

(57) ABSTRACT

A method for setting an engine speed of an internal combustion engine in a marine propulsion device to an engine speed setpoint includes receiving an operator demand from an input device and learning an adapted maximum engine speed. An engine speed setpoint is calculated by scaling the adapted maximum engine speed relative to the operator demand. The method includes predicting a position of a throttle valve of the engine that is needed to achieve the engine speed setpoint, and determining a feed forward signal that will move the throttle valve to the predicted position. A marine propulsion system has an electronic control unit that learns the adapted maximum engine speed, calculates the engine speed setpoint by scaling the adapted maximum engine speed relative to the operator demand, predicts the position of the throttle valve, and determines the feed forward signal that will move the throttle valve to the predicted position.

20 Claims, 5 Drawing Sheets

(56) References Cited

U.S. PATENT DOCUMENTS

| | | | | |
|---|---|---|---|---|
| 6,298,824 | B1 * | 10/2001 | Suhre | F02D 37/02 123/406.49 |
| 6,425,370 | B1 | 7/2002 | Kramer | |
| 6,561,016 | B1 | 5/2003 | Suhre et al. | |
| 6,587,765 | B1 | 7/2003 | Graham et al. | |
| 6,701,890 | B1 | 3/2004 | Suhre et al. | |
| 6,757,606 | B1 | 6/2004 | Gonring | |
| 7,163,000 | B2 | 1/2007 | Ishida et al. | |
| 7,357,120 | B2 | 4/2008 | Kaji | |
| 7,473,149 | B2 | 1/2009 | Mizokawa | |
| 7,556,547 | B2 | 7/2009 | Kaji | |
| 7,917,283 | B2 | 3/2011 | Kado | |
| 7,976,354 | B2 | 7/2011 | Kubota et al. | |
| 8,340,847 | B2 | 12/2012 | Sako et al. | |
| 8,762,022 | B1 | 6/2014 | Arbuckle et al. | |
| 9,039,468 | B1 | 5/2015 | Arbuckle et al. | |
| 9,145,839 | B1 | 9/2015 | Andrasko | |
| 9,156,536 | B1 | 10/2015 | Arbuckle et al. | |
| 9,248,898 | B1 | 2/2016 | Kirchhoff et al. | |
| 9,381,989 | B1 | 7/2016 | Poirier | |
| 2002/0086593 | A1 | 7/2002 | Shidara et al. | |
| 2003/0000500 | A1 | 1/2003 | Chatfield | |
| 2003/0027468 | A1 | 2/2003 | Into | |
| 2003/0054704 | A1 | 3/2003 | Kanno | |
| 2003/0109184 | A1 | 6/2003 | Kanno | |
| 2003/0120360 | A1 | 6/2003 | Yasui et al. | |
| 2004/0069271 | A1 | 4/2004 | Kanno et al. | |
| 2004/0069272 | A1 | 4/2004 | Allen et al. | |
| 2006/0047406 | A1 * | 3/2006 | Chatfield | F02D 11/105 701/104 |
| 2006/0118086 | A1 * | 6/2006 | Schwulst | F02D 41/009 123/406.47 |
| 2006/0166573 | A1 | 7/2006 | Vetta et al. | |
| 2008/0051979 | A1 | 2/2008 | Yasui et al. | |
| 2008/0280511 | A1 | 11/2008 | Kado | |
| 2009/0037073 | A1 * | 2/2009 | Jung | F02D 41/102 701/101 |
| 2010/0191397 | A1 | 7/2010 | Nose et al. | |
| 2011/0202258 | A1 | 8/2011 | Fukushima et al. | |
| 2011/0297462 | A1 | 12/2011 | Grajkowski et al. | |
| 2012/0191275 | A1 | 7/2012 | Clever et al. | |
| 2013/0035009 | A1 | 2/2013 | Kuriyagawa et al. | |

OTHER PUBLICATIONS

Newport, Motion Control Coordinate System, www.newport.com, pp. 7-2 through 7-25, website visited Nov. 18, 2014.

Arbuckle et al., Systems and Methods for Setting Engine Speed Using a Feed Forward Signal, Unpublished U.S. Appl. No. 14/573,202, filed Dec. 17, 2014.

Arbuckle et al., Systems and Methods for Setting Engine Speed in a Marine Propulsion Device, Unpublished U.S. Appl. No. 14/610,377, filed Jan. 30, 2015.

* cited by examiner

SYSTEMS AND METHODS FOR SETTING ENGINE SPEED RELATIVE TO OPERATOR DEMAND

FIELD

The present disclosure relates to marine propulsion systems for use on marine vessels, and more specifically to systems and methods for setting an engine speed of an internal combustion engine of a marine propulsion system.

BACKGROUND

U.S. Pat. No. 6,298,824, hereby incorporated by reference herein, discloses a control system for a fuel injected engine including an engine control unit that receives signals from a throttle handle that is manually manipulated by an operator of a marine vessel. The engine control unit also measures engine speed and various other parameters, such as manifold absolute pressure, temperature, barometric pressure, and throttle position. The engine control unit controls the timing of fuel injectors and the injection system and also controls the position of a throttle plate. No direct connection is provided between a manually manipulated throttle handle and the throttle plate. All operating parameters are either calculated as a function of ambient conditions or determined by selecting parameters from matrices which allow the engine control unit to set the operating parameters as a function of engine speed and torque demand, as represented by the position of the throttle handle.

U.S. Pat. No. 8,762,022, hereby incorporated by reference herein, discloses a system and method for efficiently changing controlled engine speed of a marine internal combustion engine in a marine propulsion system for propelling a marine vessel. The system responds to the operator changing the operator-selected engine speed, from a first selected engine speed to a second-selected engine speed, by predicting throttle position needed to provide the second-selected engine speed, and providing a feed forward signal moving the throttle to the predicted throttle position, without waiting for a slower responding PID controller and/or overshoot thereof, and concomitant instability or oscillation, and then uses the engine speed control system including the PID controller to maintain engine speed at the second-selected engine speed.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One example of the present disclosure is of a method for setting an engine speed of an internal combustion engine in a marine propulsion device of a marine propulsion system to an engine speed setpoint. The method includes receiving an operator demand from an input device and learning an adapted maximum engine speed. An engine speed setpoint is calculated by scaling the adapted maximum engine speed relative to the operator demand. The method includes predicting a position of a throttle valve of the engine that is needed to achieve the engine speed setpoint, and determining a feed forward signal that will move the throttle valve to the predicted position.

Another example of the present disclosure is of a marine propulsion system comprising a marine propulsion device, an internal combustion engine powering the marine propulsion device, and a throttle valve metering air intake to the internal combustion engine. The system also includes an input device for inputting an operator demand, and an electronic control unit. The electronic control unit learns an adapted maximum engine speed, calculates an engine speed setpoint by scaling the adapted maximum engine speed relative to the operator demand, predicts a position of the throttle valve that is needed to achieve the engine speed setpoint, and determines a feed forward signal that will move the throttle valve to the predicted position.

BRIEF DESCRIPTION OF THE DRAWINGS

The present disclosure is described with reference to the following figures. The same numbers are used throughout the figures to reference like features and like components.

DETAILED DESCRIPTION

In the present description, certain terms have been used for brevity, clarity, and understanding. No unnecessary limitations are to be inferred therefrom beyond the requirement of the prior art because such terms are used for descriptive purposes only and are intended to be broadly construed.

PRIOR ART

Figure 1:
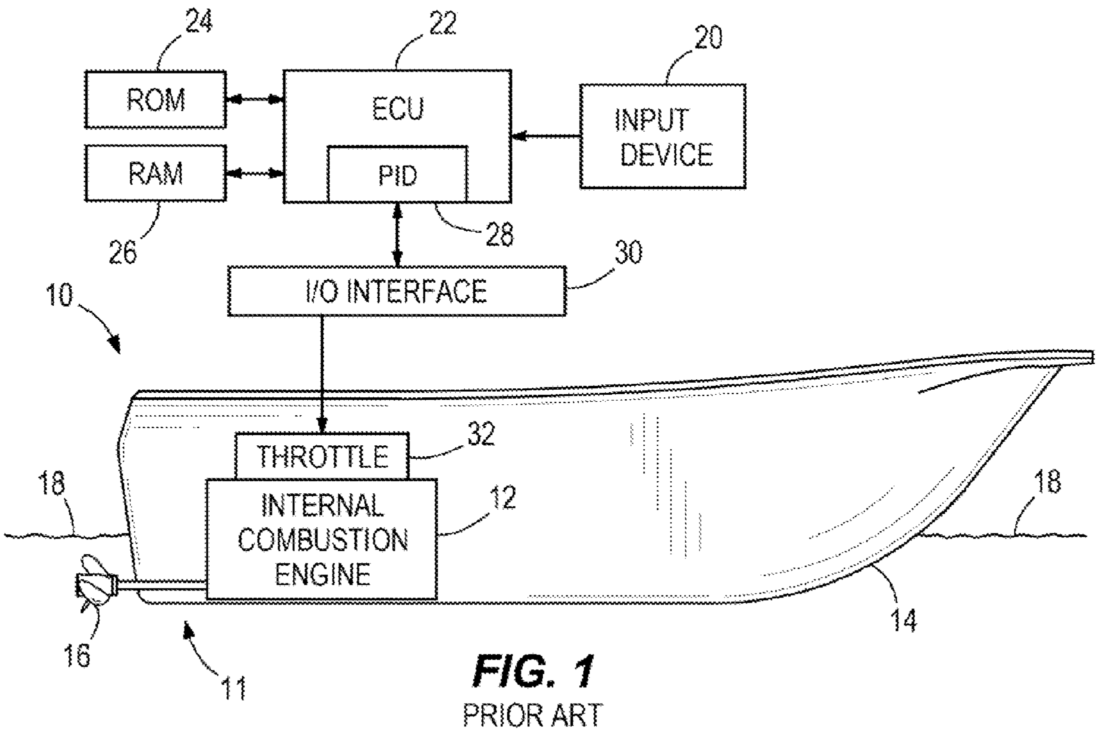
FIG. 1 PRIOR ART
FIG. 1 is a schematic illustration of marine propulsion system known in the prior art.

FIG. 1 shows a marine propulsion system 10 having an internal combustion engine 12 for propelling a marine vessel 14, e.g. by way of propeller 16, in a body of water 18. An input device 20, such as a throttle lever, joystick, button, touch screen or the like, allows an operator of the marine vessel 14 to input a signal representing operator demand. In one example, the operator demand corresponds to an operator-selected engine speed, i.e., a speed at which the operator would like the engine 12 to rotate. An electronic control unit (ECU) 22 receives the signal representing the operator-selected engine speed from the input device 20 and includes appropriate read only memory (ROM) 24 and random access memory (RAM) 26 and a processor for interpreting the signal and processing it with a proportional integral derivative (PID) feedback controller 28. Feedback controller 28 outputs a control signal to input-output (I/O) interface 30, which in turn supplies a control signal to internal combustion engine 12, including throttle valve 32. By way of control with the feedback controller 28, the ECU 22 maintains engine speed at the operator-selected engine speed by controlling the throttle valve 32, which controls engine speed according to throttle position.

In response to the operator changing the operator-selected engine speed at input device 20 from a first-selected engine speed to a second-selected engine speed (i.e. a change or delta), the ECU 22 sends a signal to move the throttle valve 32 to a new position to attempt to set the engine speed to the noted second-selected engine speed. However, this type of system is subject to overshoot, particularly at large deltas, when attempting to set engine speed to the second-selected engine speed in response to the noted change by the operator of the selected engine speed at input device 20. To accommodate various deltas, including large deltas, the feedback controller 28 is provided with enough amplification gain to provide a desired response time to accommodate the change from the first-selected engine speed to the second-selected engine speed at input device 20. The higher the amplification gain, the quicker the response time; however, higher gain makes the system subject to more overshoot and instability.

PRESENT DISCLOSURE

Figure 2:
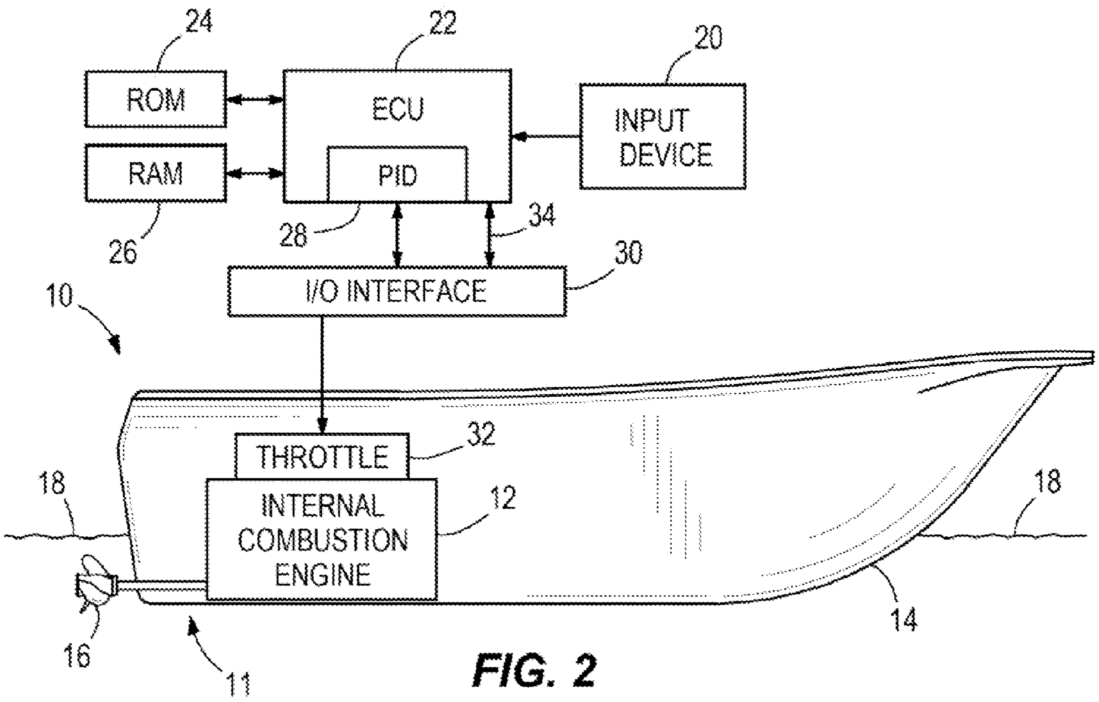
FIG. 2 is like FIG. 1, but shows a marine propulsion system according to the present disclosure.

Referring to FIG. 2, in the present system, in response to the operator changing the operator demand at input device 20 from a first operator demand to a second operator demand, the ECU 22 calculates an engine speed setpoint by scaling a learned adapted maximum engine speed relative to the second operator demand, as will be described further herein below, and then predicts a position of the throttle valve 32 needed to provide the engine speed setpoint. The ECU 22 next provides a feed forward signal at 34, which feed forward signal bypasses feedback controller 28, and moves throttle valve 32 to the predicted throttle valve position. After movement of the throttle valve 32 to the predicted throttle valve position, the feedback controller 28 corrects the position of the throttle valve 32 as needed so as to obtain and maintain the engine speed at the engine speed setpoint.

Throttle valve 32 is therefore moved to the predicted throttle position in response to the feed forward signal at 34, without waiting for the input of the feedback controller 28 to move the throttle valve 32, thereby decreasing or eliminating any overshoot otherwise caused by the system. The system of FIG. 2 thereby enables reduction of the amplification gain of the feedback controller 28 otherwise needed to accommodate the change or delta in engine speed caused by change from the first operator demand to the second operator demand at input device 20, and instead accommodates such change or delta by the predicted throttle position provided by the feed forward signal 34. The feedback controller amplification gain need only be large enough to maintain engine speed at a setpoint associated with the second operator demand, without having to accommodate the change or delta from an engine speed setpoint associated with the first operator demand to an engine speed setpoint associated with the second operator demand. The reduced amplification gain provides enhanced stability of the feedback controller 28 and reduces oscillation of the system.

Additionally, by utilizing a method wherein the learned adapted maximum engine speed is taken into account, and scaled relative to the operator demand, it is possible to reduce or eliminate a "dead zone" effect associated with the input device 20. One example of when this effect occurs is when an operator is nearing a full throttle request via the input device 20. Typically, engines are calibrated for operation at a rated maximum engine speed. However, if a marine vessel 14 is propped or loaded such that the maximum speed its engine can actually achieve is less than the rated maximum engine speed, despite what the operator demand may be, the entire load curve of the engine 12 will be shifted vis-à-vis the target nominal case for which the application was calibrated. This load curve shift creates a need for additional throttle to be added based on the difference between the engine speed setpoint and the actual engine speed (i.e. windup), and/or requires limiting output of the feedback controller 28 (more specifically, its integral term) to avoid large offsets. For example, say a non-scaled feed forward signal corresponding to an operator demand of 80% nearly maxes out the actual speed capabilities of the engine 12 (engine RPM) due to the marine vessel 14 being over propped or heavily loaded, or due to other reasons that render the engine 12 unable to achieve its rated maximum speed. If the ECU 22 did not take an actual maximum speed at which the engine 12 is capable of operating into account while calculating the engine speed setpoint, the ECU 22 would allow the engine 12 to operate at its peak speed even though the operator demand is only at 80% according to the input device 20. In other words, 80% operator demand could in fact lead to 100% of the engine's speed capabilities if the actual achievable maximum speed of the engine 12 is not taken into account while determining the engine speed setpoint.

In the above-mentioned instance, wherein the available engine speed is maxed out, if the operator used the input device 20 to increase operator demand from 80% to 100%, the speed of the engine 12 and thus of the marine vessel 14 would not be able to increase. The input device 20 would be in a "dead zone," in which actuation of the input device 20 does not affect engine speed. If the operator then used the input device 20 to decrease operator demand from 100% to 80%, the operator would experience the same effect in reverse, because the decreased operator demand would not result in decreased engine speed until the input device 20 requested a demand below the exemplary 80% operator demand threshold. Taking the actual achievable maximum engine speed into account (i.e. adapting the maximum engine speed) while determining the engine speed setpoint will therefore help avoid windup of the feedback controller 28, as well as ensure that the system 10 and its response to changes in operator demand at the input device 20 are predictable even when the marine vessel 14 is underpropped or lightly loaded in comparison to the calibrated case.

FIG. 2 thus depicts a marine propulsion system 10 comprising a marine propulsion device 11, an internal combustion engine 12 powering the marine propulsion device 11, a throttle valve 32 metering air intake to the internal combustion engine 12, and an input device 20 for inputting an operator demand. An electronic control unit 22 learns an adapted maximum engine speed, calculates an engine speed setpoint by scaling the adapted maximum engine speed relative to the operator demand, predicts a position of the throttle valve 32 that is needed to achieve the engine speed setpoint, and determines a feed forward signal 34 that will move the throttle valve 32 to the predicted position. A feedback controller 28 in the ECU 22 controls a speed of the engine 12 so as to obtain the engine speed setpoint after the throttle valve 32 has been moved to the predicted position.

Figure 3:
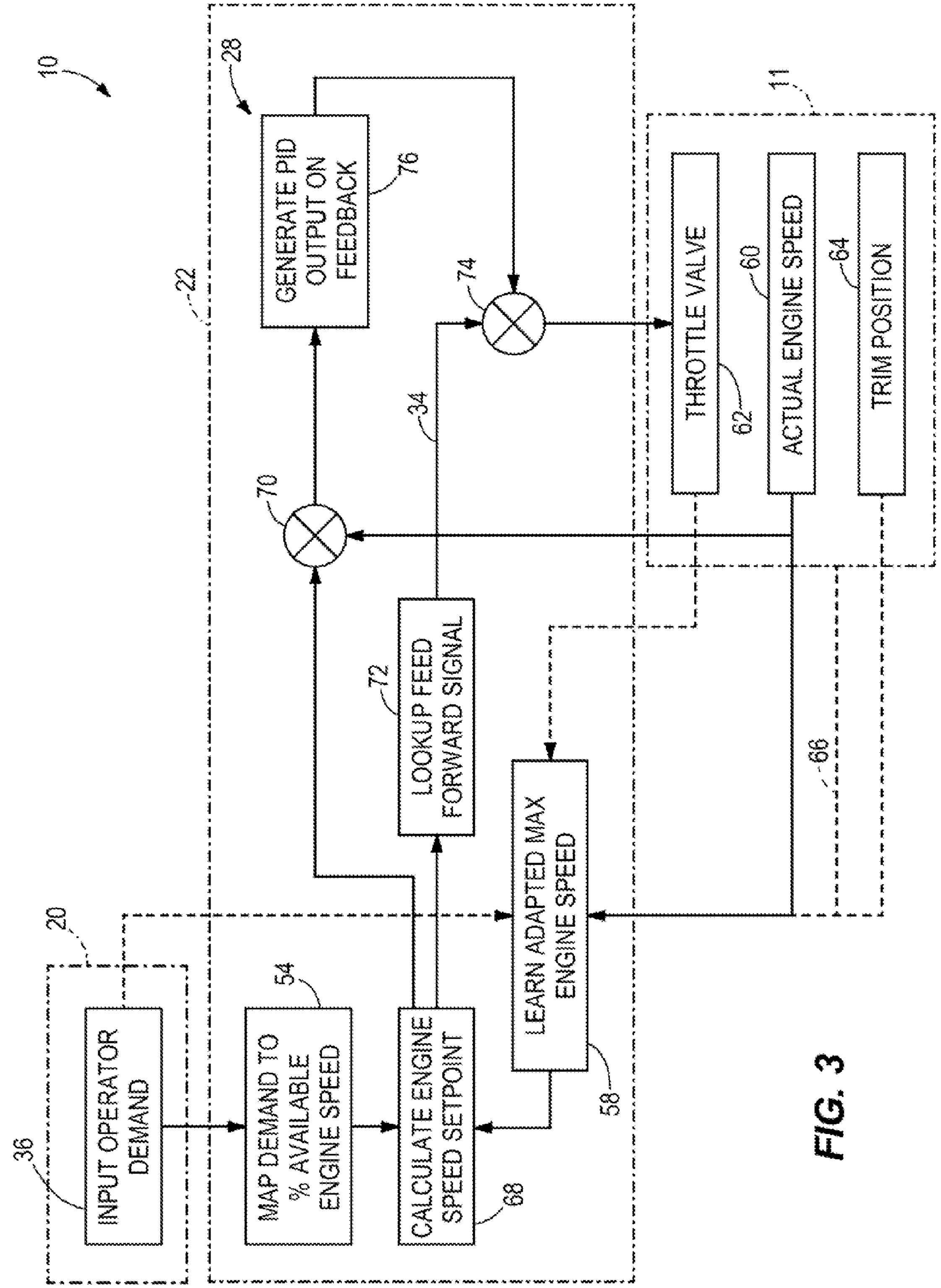
FIG. 3 is a schematic circuit diagram according to one example of the present disclosure.
Figure 4:
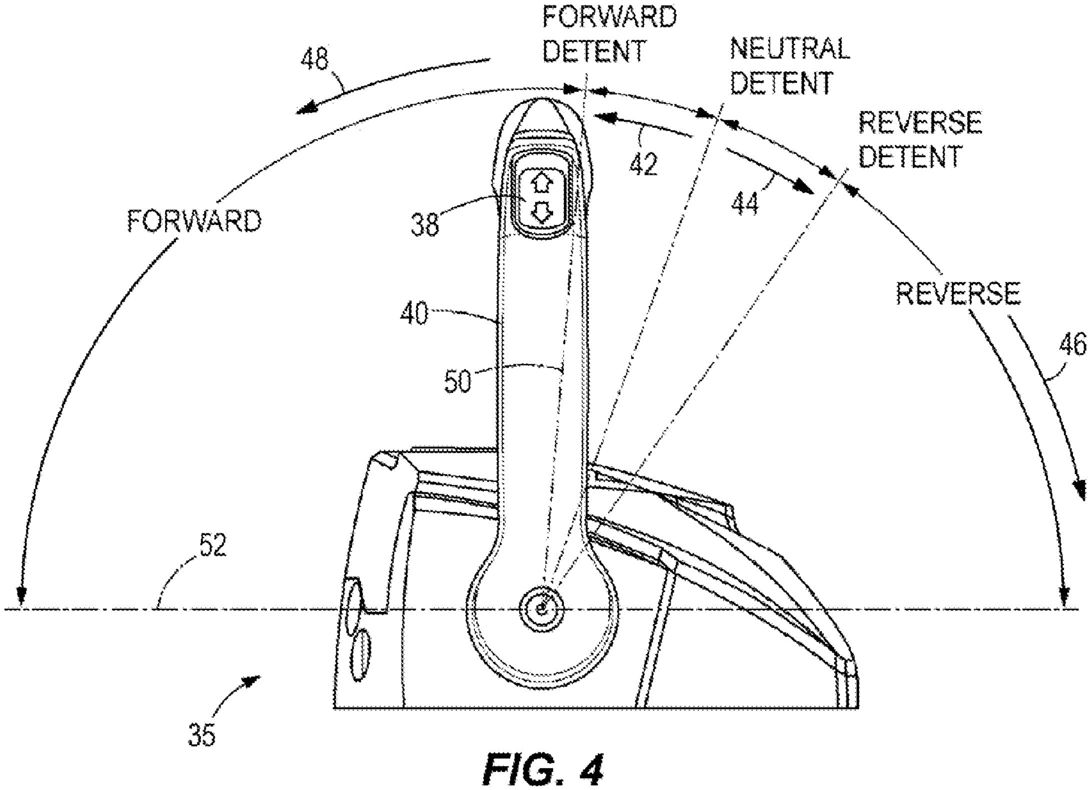
FIG. 4 shows one example of a throttle lever according to the present disclosure.

Now turning to FIG. 3, a schematic circuit diagram will be used to describe one embodiment of the system 10. As shown at box 36, an operator demand is input, for example by the operator of the marine vessel 14 manipulating input device 20 located at a helm or elsewhere aboard the marine vessel 14. In one example, the input device 20 is a throttle lever, and the operator demand corresponds to an angular position of the throttle lever as measured by, for example, a potentiometer. For example, turning to FIG. 4, one example of a throttle lever 35 will be described. As shown, the throttle lever 35 has a forward detent position, a neutral detent position, and a reverse detent position. In each of these detent positions, the throttle lever 35 sends a control signal to the ECU 22 to command the engine speed to an idle speed. The idle speed can be programmed into the system during calibration, and/or can be selectable by the operator of the marine vessel 14 via a button 38 on a handle 40 of the throttle lever 35. When the handle 40 is placed in the neutral detent position, a transmission of the marine propulsion device 11 is placed in neutral (i.e. not in gear) and the engine 12 operates at idle speed. When the handle 40 is moved from the neutral detent position in the direction of arrow 44 to reverse detent, the transmission is placed in reverse gear and the engine 12 remains at idle speed. From reverse detent, the handle 40 may be moved further in the direction of arrow 46, in order to propel the marine vessel 14 in a reverse direction.

Similarly, when the handle 40 is moved from the neutral detent position in the direction of arrow 42 to forward detent, the transmission is placed in forward gear and the engine 12 remains at idle speed. From the forward detent position, the handle 40 may be moved further in the direction of arrow 48, to provide engine speeds above the idle speed and forward thrust to the marine vessel. In this range of movement, the transmission is in forward gear, and increasing actuation of the handle 40 in the direction of arrow 48 commands increasing speed of the engine, and thus the propeller 16 and the marine vessel 14, until propping or loading conditions prevent any further speed increase. The position of the handle 40 corresponds to an operator demand and may be measured, as mentioned above, using a potentiometer. For example, the position of the handle 40 may correspond to a percentage of total allowed operator demand, such that when the handle 40 is aligned with its center axis along line 50, this corresponds to 0% operator demand, and when the handle 40 is aligned with its center axis along line 52, this corresponds to 100% operator demand. In the example shown in FIG. 4, the handle 40 is at a position corresponding to approximately 2% operator demand. In another example, the ECU 22 is programmed such that 0% operator demand corresponds to the neutral detent position, and the tables and calculations described herein below could be shifted accordingly. Additionally, it should be understood that instead of the position of the handle 40 representing a value that is quantified as a percentage, the position of the handle 40 could represent a value from 0 to 1, or could be expressed as an angular value from a given zero degree position.

Figure 5:
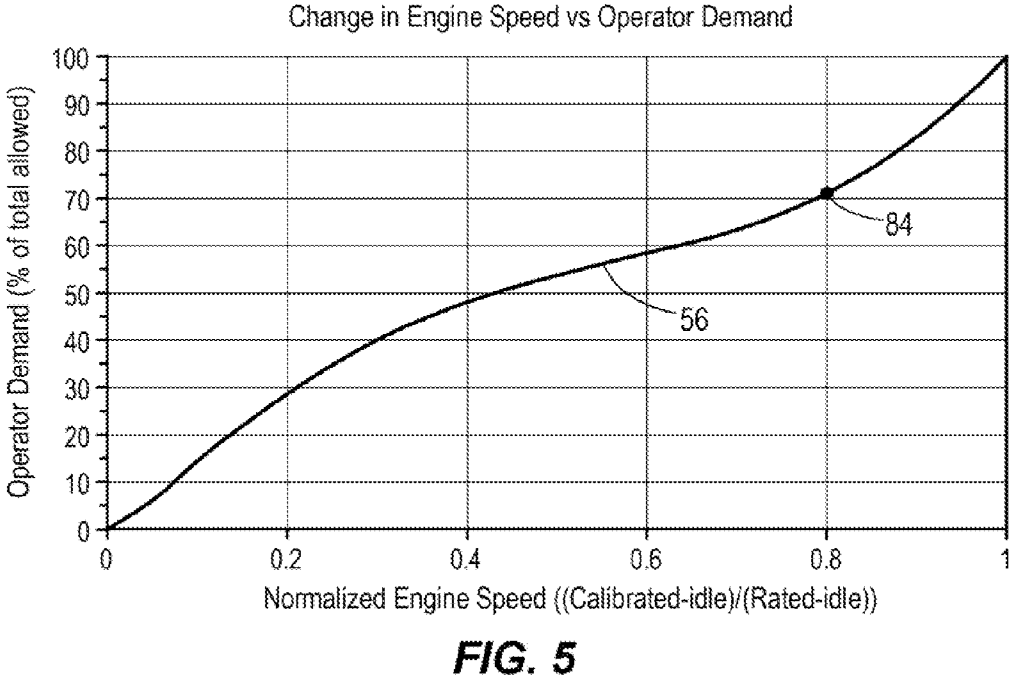
FIG. 5 is a graph illustrating one example of a relationship between change in engine speed versus change in operator demand according to the present disclosure.

Returning to FIG. 3, the operator demand is sent from box 36 to box 54, where a lookup table, graph, chart, or similar input-output map returns a value that corresponds to a desired percentage of available engine speed based on the operator demand. This is in contrast to the prior art system described above, in which the operator demand was translated directly into an operator-selected engine speed setpoint. One example of a graph representing an input/output map that returns a value corresponding to a desired percentage of available engine speed is shown in FIG. 5, which shows a curve 56 that illustrates a change in desired percentage of available engine speed versus a change in operator demand. The operator demand is shown along the vertical axis, and as discussed with respect to FIG. 4, may be quantified as a percentage of total allowed operator demand, from 0% to 100%. Values representing desired percentages of available engine speed are shown along the horizontal axis of the graph of FIG. 5, and are expressed as decimals between 0 and 1, although it should be understood that these values could be changed to percentages by multiplying them by 100%. The shape of the curve 56 represents a throttle feel, or a change in desired percentage of available engine speed relative to a given change in operator demand. As shown, the curve 56 has a first slope from about 0 to about 0.4 on the horizontal axis, which slope increases slightly from about 0.4 to about 0.8, and thereafter increases even more from about 0.8 to about 1.0. This represents a throttle feel in which travel of the throttle handle 40 through different ranges of motion provides a slightly different response with respect to change in engine speed. For example, during the last 30% of travel of the throttle handle 40, the engine speed responds with greater acceleration than during about the first 50% of travel of the throttle handle 40. The values defining the curve 56 in FIG. 5 may be directly programmed into the memory of the ECU 22. Alternatively, these values may be calculated from engine speed values that have been programmed into the ECU 22 during calibration, which engine speed values represent desired engine speed setpoints given particular positions of the throttle handle 40, assuming that the rated maximum engine speed can be reached.

Figure 6:
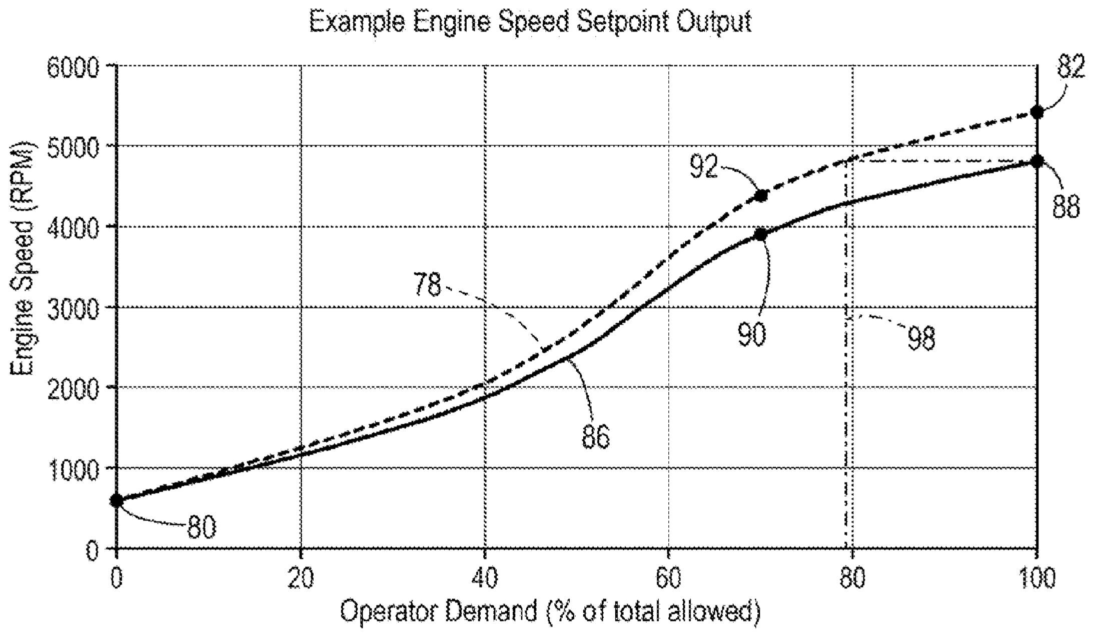
FIG. 6 is a graph illustrating one example of a relationship between operator demand and engine speed setpoint according to the present disclosure.

For example, turning to FIG. 6, engine speed in RPM is shown along the vertical axis, while operator demand as a percentage of total allowed demand is shown along the horizontal axis. The curve 78 represents a relationship between engine speed setpoints and percentages of operator demand when the system is capable of achieving the rated maximum engine speed. For example, an operator demand of 0% corresponds to an engine idle speed of about 600 RPM, as shown at point 80. As the operator demand increases to 100%, the engine speed setpoint increases along curve 78 to a final value of about 5400 RPM, as shown at point 82. In this example, 5400 RPM represents the rated maximum speed of the engine, although other rated maximum speeds are possible depending on the engine. Specific discrete engine speed setpoint values may be calibrated into the memory of the ECU 22 in order to create the particular shape of curve 78. For example, a calibrator may provide a discrete engine speed setpoint value for every 5% of throttle handle 40 travel, and the remainder of the values may be interpolated from the resulting curve. Of course, curve 78 represents only one example of a desired throttle feel, and other relationships between operator demand and engine speed setpoint are possible, such as a linear relationship, a relationship having less smooth transitions in slope, a relationship wherein the slope of the curve changes at different points, etc.

Whatever relationship between operator demand and engine speed setpoint has been calibrated into the ECU 22, the engine speed setpoint values defining this relationship can thereafter be normalized to create the curve 56 shown in FIG. 5. The normalized set of values can be calculated by subtracting the engine idle speed (either rated or chosen by the operator) from each discrete calibrated engine speed setpoint, and dividing these numbers by the difference between the rated maximum engine speed and the idle speed:

$$\text{normalized value} = \frac{(\text{calibrated engine speed} - \text{idle speed})}{(\text{rated max speed} - \text{idle speed})} \quad \text{Eq. 1.0}$$

Each normalized value is then re-associated with its respective operator demand in order to graph the curve 56. The ECU 22 may then map a desired percentage of available engine speed from the normalized set of values representing a change in desired percentage of available engine speed relative to a given change in the operator demand, for example, using the graph of FIG. 5. The desired percentage of available engine speed can then be used to scale an adapted maximum engine speed, which can be determined as discussed herein below. Thus, normalization of a demand-to-engine-speed-setpoint map allows each marine propulsion system application to be customized to provide the same percentage of available engine operating speed given a particular operator demand, which results in a consistent throttle feel across marine vessels with different loading and propping conditions.

Meanwhile, returning to FIG. 3, as shown at box 58, the ECU 22 learns the adapted maximum engine speed, or the maximum speed that the engine 12 is able to obtain given the load associated with the marine vessel 14 and the propping conditions of the marine propulsion device 11. This value may correspond to the rated maximum engine speed if the system conditions are close to the conditions present when the system was first calibrated. However, this speed could instead be less than the rated maximum engine speed, if a load on the system 10 is greater than when the engine was calibrated, or if the marine propulsion device 11 is over propped relative to the nominal case.

In order to learn the adapted maximum engine speed, the ECU 22 can read an actual maximum engine speed, for example using a tachometer as shown at box 60. This actual maximum engine speed can thereafter be saved in the memory of the ECU 22 as the adapted maximum engine speed that is available given the loading and propping conditions of the marine propulsion system 10. However, in order to ensure that the ECU 22 is reading and saving the actual maximum engine speed (i.e. to avoid learning an incorrect, less-than-maximum engine speed) several criteria may be required to be met before the adapted max engine speed can be learned. For example, the ECU 22 may learn the adapted maximum engine speed only when a measured speed of the engine 12 exceeds a certain speed. In one example, the certain speed could be 4700 RPM, although other speeds could be programmed into the ECU 22. Additionally or alternatively, the adapted maximum engine speed may be learned only when the position of the throttle valve 32 is within a certain range of wide open throttle. For example, the adapted maximum engine speed may only be learned when the throttle position is at 100% (wide open throttle), within 5% of wide open throttle, or within another certain programmed range of wide open throttle. The throttle position can be measured, for example, using a throttle position sensor, as shown at box 62. Additionally or alternatively, the adapted maximum engine speed may be learned only when the operator demand exceeds a certain demand. For example, the adapted maximum engine speed may be learned only when the input device 20 requests a demand at box 36 that is greater than 95%, greater than 98%, or greater than another programmed value.

Additionally or alternatively, the adapted maximum engine speed may be learned only when at least one of the following other conditions is present: a trim angle of the marine propulsion device 11 exceeds a certain angle, and a load on the engine 12 exceeds a certain load. The trim position may be measured at box 64 using a trim position sensor. As an example, the trim position may be required to be at maximum trim (or within a certain angle of maximum trim) before the adapted maximum engine speed will be learned. The load on the engine 12 may be calculated based on measured conditions such as air flow, fueling, intake air temperature, spark timing, manifold air pressure, or any combination of these conditions. For example, the engine load may be required to be above a certain load, or an air flow may be required to be above a certain air flow, before the adapted maximum engine speed will be learned. Sensors for these types of values, such as a MAF sensor, MAP sensor, IAT sensor, etc. may send their measurements over line 66 to box 58. At box 58, the ECU 22 may perform a load calculation using these measured values, and may perform a conjunctive analysis of any of the other above-mentioned enable criteria programmed into its memory, in order to determine whether the engine speed read at box 60 should be saved as the adapted maximum engine speed.

Each of the enable criteria mentioned above (engine speed, throttle lever position, trim sensor position, throttle valve position, and engine load) may be required to be met before the ECU 22 will learn the adapted maximum engine speed. Alternatively, different combinations of these enable criteria may be required to be met in order for the ECU 22 to learn the adapted maximum engine speed. In any case, enough enable criteria should be used to determine that the engine 12 is actually operating at its maximum speed, as the enable criteria are chosen to reflect the most efficient operating conditions of the vessel and to provide redundancy of measurements. If the required criteria are in fact met, the actual engine speed is read as shown at box 60, and this value is provided to box 58 as the adapted maximum engine speed. The adapted maximum engine speed is thereafter sent to box 68 for calculation of the engine speed setpoint, as will be described further herein below.

At box 68, the ECU 22 calculates the engine speed setpoint after it has been provided with the desired percentage of available engine speed from box 54 (determined by using the graph shown in FIG. 5) and with the adapted maximum engine speed (determined according to the methods described with respect to box 58). The ECU 22 may do so by calculating a difference between the idle speed of the engine 12 and the adapted maximum engine speed from box 58, multiplying this difference by the desired percentage of available engine speed from box 54, and then adding the multiplied difference to the idle speed:

$$\text{engine speed setpoint}=((\text{adapted max speed}-\text{idle})*\text{percent desired speed})+\text{idle} \quad \text{Eq. 2.0:}$$

By performing this calculation, the ECU 22 can affect the throttle feel of the input device 20 (e.g. the throttle handle 40). For example, a change in engine speed will result from the entire path of movement of the throttle handle 40 from 0% operator demand at the forward detent position, to 100% operator demand when the handle 40 is aligned with line 52. In other words, the dead zone effect mentioned above will be eliminated, even when the engine 12 cannot achieve the rated maximum engine speed. The method of the present disclosure effectively translates the operator demand input at the input device 20 into a percentage of available engine operating speed. The engine speed setpoint that is used to look up the feed forward signal can then be calculated by using equation 2.0 provided above, and will range from the idle speed to the adapted maximum engine speed (rather than to the rated maximum speed, if the rated speed is unachievable).

FIG. 6 shows two examples of the output of box 68 according to the method described above. As already described, curve 78 represents the engine speed setpoints that are output when the maximum available engine speed is equal to the rated maximum engine speed. For example, the rated maximum engine speed may be 5400 RPM as shown at point 82. However, now assume that the adapted maximum engine speed is only 4800 RPM (point 88) as determined at box 58. Also assume that the operator demand is about 71%. As described above with respect to box 54, the normalized curve 56 (FIG. 5) may be used to read a percentage of desired engine speed from this operator demand. For example, the throttle feel curve 56 may dictate that 71% operator demand corresponds to a desired percentage of available engine speed of about 0.8 (80%), as shown at point 84 in FIG. 5. With this value, the adapted maximum engine speed of 4800 RPM, and an assumed idle speed of 600 RPM plugged into equation 2.0 provided above, an engine speed setpoint of about 3960 RPM will be returned as shown at point 90 in FIG. 6:

$$\text{engine speed setpoint}=((4800-600)*0.8)+600=3960\ \text{RPM} \quad \text{Eq. 2.1:}$$

However, if the system 10 were set up (loaded and propped) such that the rated engine speed at point 82 was able to be achieved, an operator demand of 71% would instead correspond to an engine speed setpoint of about 4440 RPM, as shown at point 92:

$$\text{engine speed setpoint}=((5400-600)*0.8)+600=4440\ \text{RPM} \quad \text{Eq. 2.2:}$$

In other words, the method of the present disclosure shifts the entire engine speed response curve down from the curve shown at 78 to the curve shown at 86 due to the fact that the adapted maximum engine speed at point 88 is less than the rated maximum engine speed at point 82. This ensures that the operator feels a difference (increase) in engine speed as he moves the handle 40 of the throttle lever 35 all the way to a 100% demand request. If the maximum engine speed were only 4800 RPM, but the system was not adapted according to the method described herein, then the operator would reach peak engine speed at a position of the handle 40 corresponding to about 78% of its available travel (see dashed line 98), and any movement of the handle 40 between 78% and 100% of its travel would not cause a change in engine speed.

Figure 7:
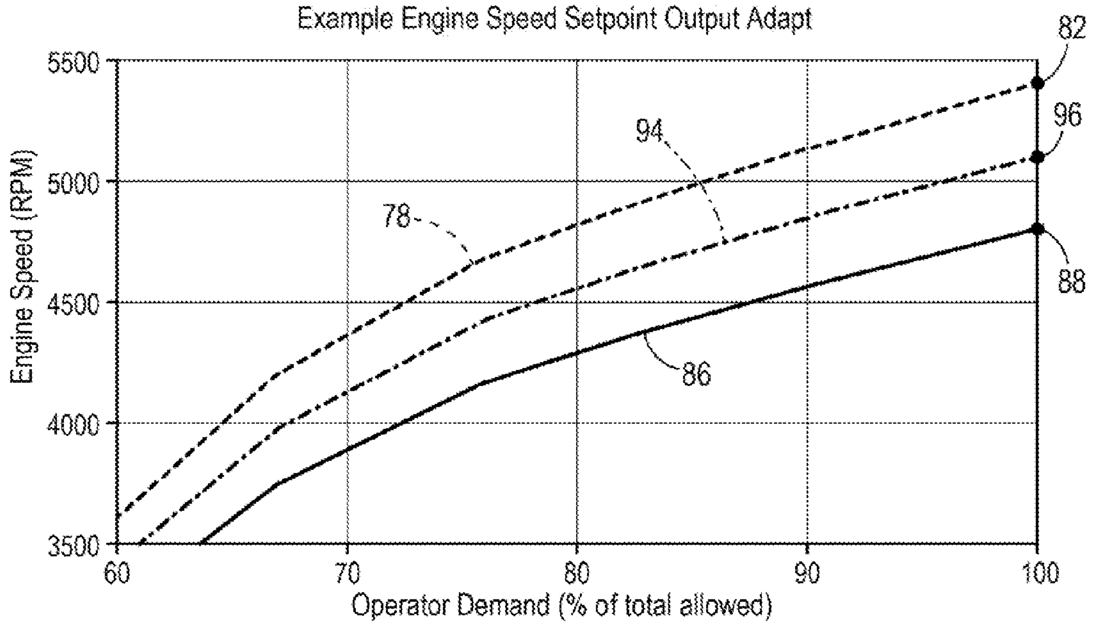
FIG. 7 is a graph illustrating one example of a strategy for adapting an engine speed setpoint.

Returning to FIG. 3, in one example, at box 58 the ECU 22 gradually transitions the adapted maximum engine speed from the rated maximum engine speed to the measured actual maximum engine speed over at least one driving cycle of the marine propulsion system 10. FIG. 7 shows one example of this gradual transition, in which the curve 78 representing the throttle feel when the rated maximum engine speed of 5400 RPM is achievable is adapted down toward the curve 86, representing the throttle feel when the actual measured maximum engine speed is 4800 RPM. Here, one cycle of adaptation is shown by the curve 94. In this cycle, the adapted maximum engine speed is set to about 5100 RPM (or halfway between the rated and actual max speeds) as shown at point 96. The curve 94 is generated during one driving cycle by plugging 5100 RPM into equation 2.0 provided above at various desired percentages of available engine speed. In the next driving cycle, the curve 86 is generated by plugging in 4800 RPM into equation 2.0. In another example, the ECU 22 may set the adapted maximum engine speed to values representing, for example, 100 RPM increments below the rated maximum engine speed during each driving cycle. In other words, the ECU 22 may set the adapted maximum engine speed for purposes of calculating the engine speed setpoint at box 68 to 5300 RPM during the first driving cycle, 5200 RPM during the second driving cycle, 5100 RPM during the third driving cycle, and so on until the adapted maximum engine speed reaches the actual measured maximum value of 4800 RPM. Alternatively, the ECU 22 may gradually undertake the adaptation process according to percentages. For example, if the system needs to adapt by 10% of the rated maximum engine speed, the ECU 22 may choose to decrease the adapted maximum engine speed for purposes of calculation of the engine speed setpoint by 2% per driving cycle.

What constitutes a "driving cycle" could be defined during programming of the system. In one example, a driving cycle corresponds to each key cycle, i.e. when the engine is turned on after having been off. In another example, a driving cycle is defined as each time the adaptation routine becomes active within a key cycle, based on fulfillment of the enable criteria mentioned above. In yet another example, a driving cycle is defined by a change in measured coolant temperature, such as a change from a relatively higher temperature to a relatively lower temperature of greater than a certain temperature value, or of greater than a certain percent, or as defined by the manufacturer during programming of the system. The amount by which the adapted maximum engine speed changes during each driving cycle, however defined, may be limited so as to provide gradual adaptation that is undetectable from the standpoint of the operator. For example, the increments by which the adapted maximum engine speed is changed would be programmed to be small enough such that the operator does not feel an abrupt change in engine speed or in throttle feel as the adaptation occurs. If the actual measured maximum engine speed is much less than the rated maximum engine speed, the system may chose to adapt in larger increments than if the adapted and rated engine speeds are close to one another, but these increments may still be programmed small enough that the change is undetectable to the operator.

Returning to FIG. 3, after the engine speed setpoint has been calculated at box 68 (whether it was calculated using the final adapted maximum engine speed or an intermediate adapted maximum engine speed), the engine speed setpoint is then sent to a first summer 70. As shown at box 72, the engine speed setpoint is also used to determine the feed forward signal (for example by way of another lookup table), which feed forward signal 34 (see FIG. 2) corresponds to a particular predicted position of the throttle valve 32. The feed forward signal 34 is then provided to a second summer 74, bypassing feedback controller 28. During a first iteration, the output of second summer 74 is simply the feed forward signal 34, which is provided to the engine 12 to move the throttle valve 32 to the predicted position, as shown at box 62.

As shown at box 60, the actual engine speed is measured, again for example using a tachometer, and this value is provided to the first summer 70. The first summer 70 compares the engine speed setpoint from box 68 with the actual engine speed from box 60, and a difference between the two is sent to the feedback controller 28. As shown at box 76, the feedback controller 28 generates a PID output on the feedback regarding the engine speed setpoint versus the actual engine speed. The PID output from box 76 is summed with the feed forward signal 34 from box 72 at second summer 74, and this summed signal now dictates the position of the throttle valve 32, as shown at box 62. In this way, if the predicted position of the throttle valve 32 (based solely on feed forward signal 34) has not resulted in the actual engine speed reaching the engine speed setpoint, the feedback controller 28 can adjust the position of the throttle valve 32 to obtain the engine speed setpoint. The predicted position of the throttle valve 32 might not result in the setpoint immediately due to the inexactness of a calibrated predicted throttle position, or due to external conditions acting on the marine propulsion system 10 that cause the vessel speed not to follow the standard calibrated speed versus load curve, such as a heavy load on the system 10, an age of the engine 12, a barometric pressure of the surrounding atmosphere, characteristics of the propeller 16, or any other condition that consistently affects the ability of the predicted throttle position as calibrated to achieve a particular engine speed. Under steady-state conditions, the feedback controller 28 is able to stabilize the system 10 at the engine speed setpoint, which may require some iteration of movement of the throttle valve 32 and subsequent comparison of the resulting actual engine speed to the setpoint. The feedback controller 28 also continues to work to maintain the engine speed at the engine speed setpoint despite changing external circumstances or conditions.

Figure 8:
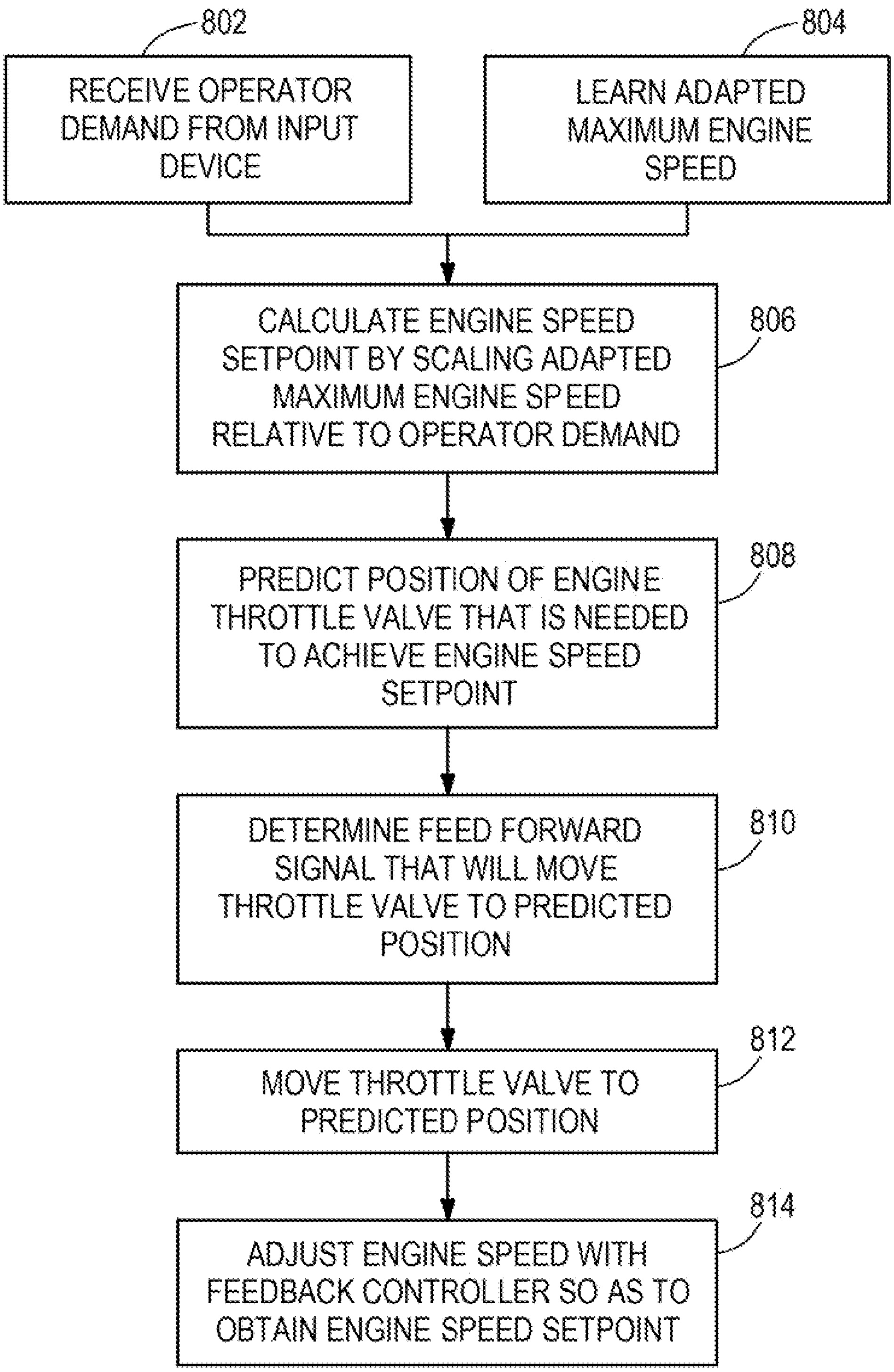
FIG. 8 is a flow chart showing a method according to the present disclosure.

Turning to FIG. 8, a method for setting an engine speed of an internal combustion engine 12 in a marine propulsion device 11 of a marine propulsion system 10 to an engine speed setpoint will be described. As shown at 802, the method includes receiving an operator demand from an input device 20. The operator demand may correspond to a value between 0% and 100%, as described above with respect to FIG. 4. The method may also include, as shown at 804, learning an adapted maximum engine speed. This learning may be done according to the description herein above of box 58 in FIG. 3.

Next, at box 806, the method may include calculating an engine speed setpoint by scaling the adapted maximum engine speed relative to the operator demand. This may be done by mapping the operator demand to a desired percentage of available engine speed, wherein the desired percentage of available engine speed is mapped from a normalized set of values representing a change in the desired percentage of available engine speed relative to a given change in the operator demand, as described above with respect to FIG. 5. This desired percentage of available engine speed can then be used in the following equation to calculate the engine speed setpoint:

$$\text{engine speed setpoint}=((\text{adapted max. speed}-\text{idle})*\text{percent desired speed})+\text{idle} \quad \text{Eq. 2.0:}$$

As shown box 808, the method may next include predicting a position of a throttle valve 32 of the engine 12 that is needed to achieve the engine speed setpoint. The method may then include determining a feed forward signal 34 that move the throttle valve 32 to the predicted position, as shown at 810 and as further described with respect to box 72 in FIG. 3. The method may then include, as shown at box 812, moving the throttle valve 32 to the predicted position. At shown 814, the method may further include adjusting the engine speed with a feedback controller 28 after moving the throttle valve 32 to the predicted position so as to obtain the engine speed setpoint. This is described further with respect to boxes 76, 62, and summer 70 in FIG. 3.

The above-mentioned system and method can be used to improve functions of a marine vessel while it operates in modes such as auto sync and cruise control. In auto sync mode, the speed of a first internal combustion engine (the "peer" engine) is synchronized to the speed of a second internal combustion engine (the "master" engine) of the marine propulsion system 10. If the target speeds of both master and peer engines are normalized such that each can only reach its adapted maximum engine speed, less adjustment may be needed to bring the peer engine to the speed of the master engine if their adapted maximum engine speeds vary (for example, if the peer marine propulsion device is trimmed differently than the master marine propulsion device). In cruise control mode, all engines are provided with the same setpoint speed. If this setpoint speed is set to the lowest adapted maximum engine speed of all the engines, then all engines will be able to reach this adapted maximum speed.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

What is claimed is:

1. A method for setting an engine speed of an internal combustion engine in a marine propulsion device of a marine propulsion system to an engine speed setpoint, the method comprising:

receiving an operator demand from an input device;

learning an adapted maximum engine speed;

calculating an engine speed setpoint by scaling the adapted maximum engine speed relative to the operator demand;

predicting a position of a throttle valve of the engine that is needed to achieve the engine speed setpoint; and determining a feed forward signal that will move the throttle valve to the predicted position.

2. The method of claim 1, further comprising adjusting the engine speed with a feedback controller after moving the throttle valve to the predicted position so as to obtain the engine speed setpoint.

3. The method of claim 1, further comprising mapping the operator demand to a desired percentage of available engine speed.

4. The method of claim 3, wherein the desired percentage of available engine speed is mapped from a normalized set of values representing a change in the desired percentage of available engine speed relative to a given change in the operator demand.

5. The method of claim 3, further comprising calculating the engine speed setpoint by:

calculating a difference between an idle speed of the engine and the adapted maximum engine speed;

multiplying the difference by the desired percentage of available engine speed; and adding the multiplied difference to the idle speed.

6. The method of claim 1, further comprising learning the adapted maximum engine speed only when a measured speed of the engine exceeds a certain speed.

7. The method of claim 6, further comprising learning the adapted maximum engine speed only when the position of the throttle valve is within a certain range of wide open throttle.

8. The method of claim 6, further comprising learning the adapted maximum engine speed only when the operator demand exceeds a certain demand.

9. The method of claim 6, further comprising learning the adapted maximum engine speed only when at least one of the following conditions is present: a trim angle of the marine propulsion device exceeds a certain angle, and a load on the engine exceeds a certain load.

10. The method of claim 6, further comprising gradually transitioning the adapted maximum engine speed from a rated maximum engine speed to a measured actual maximum engine speed over at least one driving cycle of the marine propulsion system.

11. The method of claim 1, wherein the input device is a throttle lever and the operator demand corresponds to a measured position of the throttle lever.

12. A marine propulsion system comprising:

a marine propulsion device;

an internal combustion engine powering the marine propulsion device;

a throttle valve metering air intake to the internal combustion engine;

an input device for inputting an operator demand; and an electronic control unit, wherein the electronic control unit:

learns an adapted maximum engine speed;

calculates an engine speed setpoint by scaling the adapted maximum engine speed relative to the operator demand;

predicts a position of the throttle valve that is needed to achieve the engine speed setpoint; and determines a feed forward signal that will move the throttle valve to the predicted position.

13. The marine propulsion system of claim 12, further comprising a feedback controller that controls a speed of the engine so as to obtain the engine speed setpoint after the throttle valve has been moved to the predicted position.

14. The marine propulsion system of claim 12, wherein the electronic control unit maps the operator demand to a desired percentage of available engine speed.

15. The marine propulsion system of claim 14, wherein the electronic control unit maps the desired percentage of available engine speed from a normalized set of values representing a change in the desired percentage of available engine speed relative to a given change in the operator demand.

16. The marine propulsion system of claim 14, wherein the electronic control unit calculates the engine speed setpoint by:

calculating a difference between an idle speed of the engine and the adapted maximum engine speed;

multiplying the difference by the desired percentage of available engine speed; and adding the multiplied difference to the idle speed.

17. The marine propulsion system of claim 12, wherein the electronic control unit learns the adapted maximum engine speed only when a measured speed of the engine exceeds a certain speed.

18. The marine propulsion system of claim 17, wherein the electronic control unit learns the adapted maximum engine speed only when at least one of the following conditions is present:

the position of the throttle valve is within a certain range of wide open throttle;

the operator demand exceeds a certain demand;

a trim angle of the marine propulsion device exceeds a certain angle; and a load on the engine exceeds a certain load.

19. The marine propulsion system of claim 17, wherein the electronic control unit gradually transitions the adapted maximum engine speed from a rated maximum engine speed to a measured actual maximum engine speed over at least one driving cycle of the marine propulsion system.

20. The marine propulsion system of claim 12, wherein the input device is a throttle lever and the operator demand corresponds to a measured position of the throttle lever.

* * * * *